United States Patent
DeMarco et al.

(10) Patent No.: US 10,725,895 B2
(45) Date of Patent: * Jul. 28, 2020

(54) MEASURING AND IMPROVING TEST COVERAGE

(71) Applicant: International Business Machines Corporation, Armonk, NY (US)

(72) Inventors: Dominic DeMarco, Hyde Park, NY (US); Christopher Loers, Poughkeepsie, NY (US); Alexander Smith, East Haddam, CT (US); Brad D. Stilwell, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,520

(22) Filed: Nov. 3, 2017

(65) Prior Publication Data

US 2019/0102282 A1    Apr. 4, 2019

Related U.S. Application Data (63) Continuation of application No. 15/724,449, filed on Oct. 4, 2017.

(51) Int. Cl.
  *G06F 11/36* (2006.01)
(52) U.S. Cl.
  CPC ...... *G06F 11/3684* (2013.01); *G06F 11/3612* (2013.01); *G06F 11/3636* (2013.01);
  (Continued)
(58) Field of Classification Search
  CPC .................................................. G06F 11/3684
  (Continued)

(56) References Cited

U.S. PATENT DOCUMENTS 5,193,180 A *  3/1993 Hastings ............... G06F 8/447
                                                 714/E11.211
6,106,571 A *  8/2000 Maxwell ............ G06F 11/3644
                                                 714/E11.209
(Continued)

FOREIGN PATENT DOCUMENTS

CN        106326118 A      1/2017

OTHER PUBLICATIONS

Herbert Pesch, Peter Schnupp, Hans Schaller, and Anton Paul Spirk. 1985. Test case generation using Prolog. In Proceedings of the 8th international conference on Software engineering (ICSE '85). IEEE Computer Society Press, Los Alamitos, CA, USA, 252-258 (Year: 1985).*

(Continued)

*Primary Examiner* — James D. Rutten
(74) *Attorney, Agent, or Firm* — Cantor Colburn LLP; Teddi Maranzano (57) ABSTRACT

Embodiments of the invention include methods and systems for improving test case coverage. Aspects of the invention include executing, by a processor, a first test case, where the first test case includes a plurality of system calls to an operating system. Prior to execution of each system call in the plurality of system calls in the first test case, executing, by the processor, a pre-exit instruction. Responsive to execution of the pre-exit instruction, collecting pre-exit system call data regarding each system call in the plurality of system calls for the first test case. The processor executes a post-exit instruction after completion of each system call in the plurality of system calls and responsive to execution of the post-exit instruction, collects post-exit system call data regarding each system call in the plurality of system calls for the first test case.

8 Claims, 5 Drawing Sheets

(52) U.S. Cl.
CPC ...... *G06F 11/3664* (2013.01); *G06F 11/3676* (2013.01); *G06F 11/3688* (2013.01); *G06F 11/3692* (2013.01)

(58) Field of Classification Search
USPC ........................................................ 717/124
See application file for complete search history.

(56) References Cited

U.S. PATENT DOCUMENTS

| | | | | |
|---|---|---|---|---|
| 6,529,985 | B1* | 3/2003 | Deianov | G06F 9/54 |
| | | | | 710/260 |
| 6,735,774 | B1* | 5/2004 | Krishnaswamy | G06F 11/3636 |
| | | | | 711/1 |
| 6,763,360 | B2* | 7/2004 | Hartley | G06F 11/3676 |
| 2002/0174416 | A1* | 11/2002 | Bates | G06F 11/3636 |
| | | | | 717/128 |
| 2003/0055836 | A1* | 3/2003 | Dubovsky | G06F 11/3664 |
| 2003/0088854 | A1* | 5/2003 | Wygodny | G06F 11/3636 |
| | | | | 717/130 |
| 2003/0229889 | A1* | 12/2003 | Kuzmin | G06F 11/3676 |
| | | | | 717/130 |
| 2004/0153830 | A1* | 8/2004 | Cebula | G06F 11/3688 |
| | | | | 714/38.14 |
| 2009/0070746 | A1* | 3/2009 | Dhurjati | G06F 11/3676 |
| | | | | 717/128 |
| 2009/0319832 | A1* | 12/2009 | Zhang | G06F 11/3684 |
| | | | | 714/38.1 |
| 2012/0174076 | A1* | 7/2012 | Rajic | G06F 11/3466 |
| | | | | 717/128 |
| 2013/0262017 | A1* | 10/2013 | Segall | G06F 11/263 |
| | | | | 702/108 |
| 2016/0259715 | A1 | 9/2016 | Zheng et al. | |

OTHER PUBLICATIONS

DeMarco et al., "Measuring and Improving Test Coverage", U.S. Appl. No. 15/724,449, filed Oct. 4, 2017.
List of Patent Applications Treated as Related; (Appendix P), filed Nov. 3, 2017; 2 pages.

* cited by examiner

MEASURING AND IMPROVING TEST COVERAGE

DOMESTIC PRIORITY

The present application claims priority to U.S. Nonprovisional application Ser. No. 15/724,449 filed on Oct. 4, 2017, titled "MEASURING AND IMPROVING TEST COVERAGE," assigned to the assignee hereof and expressly incorporated by reference herein.

BACKGROUND

The present invention generally relates to software test cases, and more specifically, to measuring and improving test coverage.

In large-scale computing systems such as mainframe systems, users often use software to control and view portions of the operation and resources of the system. Scheduling of jobs and workload, batch job outputs, and log files are often monitored and controlled by a user using software. Software developers often run a variety of test cases to ensure that the software operates as designed. Test cases typically include code that drives a series of system calls to an operating system. The testing process can be time-consuming and cumbersome. Estimating and improving test case generation is important for gaining confidence in system tests and to improve test case quality. Measuring test coverage of a given test generation tool can be costly. Tracking each instruction and using feedback (between the test case build and result prediction processes) requires extensive analysis and consumes substantial test time.

SUMMARY

Embodiments of the present invention are directed to a computer-implemented method for improving test coverage. A non-limiting example of the computer-implemented method includes executing, by a processor, a first test case, where the first test case includes a plurality of system calls to an operating system. Prior to execution of each system call in the plurality of system calls in the first test case, executing, by the processor, a pre-exit instruction. Responsive to execution of the pre-exit instruction, collecting pre-exit system call data regarding each system call in the plurality of system calls for the first test case. The processor executes a post-exit instruction after completion of each system call in the plurality of system calls and responsive to execution of the post-exit instruction, collects post-exit system call data regarding each system call in the plurality of system calls for the first test case.

Embodiments of the present invention are directed to a system for improving test coverage. A non-limiting example of the system includes executing, by a processor, a first test case, where the first test case includes a plurality of system calls to an operating system. Prior to execution of each system call in the plurality of system calls in the first test case, executing, by the processor, a pre-exit instruction. Responsive to execution of the pre-exit instruction, collecting pre-exit system call data regarding each system call in the plurality of system calls for the first test case. The processor executes a post-exit instruction after completion of each system call in the plurality of system calls and responsive to execution of the post-exit instruction, collects post-exit system call data regarding each system call in the plurality of system calls for the first test case.

Embodiments of the invention are directed to a computer program product for improving test coverage, the computer program product comprising a computer readable storage medium having program instructions embodied therewith. The program instructions are executable by a processor to cause the processor to perform a method. A non-limiting example of the method executing, by a processor, a first test case, where the first test case includes a plurality of system calls to an operating system. Prior to execution of each system call in the plurality of system calls in the first test case, executing, by the processor, a pre-exit instruction. Responsive to execution of the pre-exit instruction, collecting pre-exit system call data regarding each system call in the plurality of system calls for the first test case. The processor executes a post-exit instruction after completion of each system call in the plurality of system calls and responsive to execution of the post-exit instruction, collects post-exit system call data regarding each system call in the plurality of system calls for the first test case.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
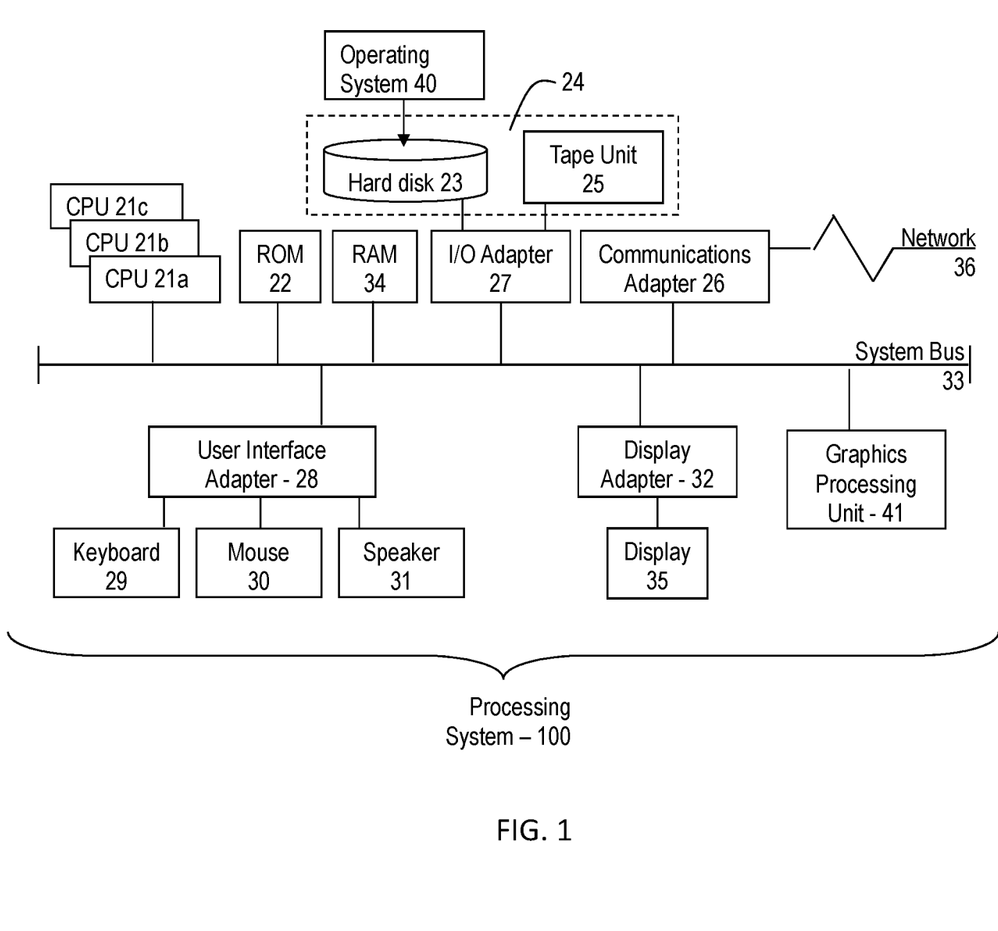
FIG. 1 depicts a block diagram of a computer system for use in implementing one or more embodiments of the present invention.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

Turning now to an overview of technologies that are more specifically relevant to aspects of the invention, test cases are often utilized to test the functionality of computer programs. A test case is a set of test inputs, execution conditions, and expected results developed for a particular objective, such as, for example, to exercise a particular program path or to verify compliance with a specific requirement. Test cases are utilized to gain information about a program such as whether the program will pass or fail the test case. Often, test cases are utilized to test system calls to an operating system. A system call is a programmatic way in which a computer program (e.g., the test case) requests a service from a kernel of an operating system. These services can include hardware-related services (e.g., accessing a hard disk drive), creation and execution of new processes, and communication with integral kernel services such as process scheduling. A system call is essentially an interface between a process and the operating system. It can be a challenge to gauge how effective test cases are at driving the system call that the test case is testing. System calls can have a variety of options and can be invoked in multiple ways.

Turning now to an overview of the aspects of the invention, one or more embodiments of the invention address the above-described shortcomings by providing methods, systems, and computer program products for measuring and improving test case coverage and testing pre and post system call exits. In a test case, an exit is utilized to gain control of a program such as a test case. An example exit would be when a user is attempting to open a file, and an authentication GUI requesting user credentials appears. The exit would be called to authenticate the user prior to passing an open system call (sometimes referred to as, "syscall") to the operating system. These exits can be used to measure how effective a test case or series of test cases are against a particular set of system calls. Information about the system call, such as the calling environment and the parameters passed to the system call, can be captured during the exits. An assessment can then be made about the effectiveness of a particular test case or a suite of test cases. Using this information, additional test cases can then be automatically generated using parameters and options which were not covered by the original test cases.

In one or more embodiments, the method allows for a test case to run on a system and capture information each time a system call (SYSCALL) is driven, and utilize the information to automatically generate additional tests, improve test coverage, and provide metrics for code coverage by the tests. More specifically, the method sets up an exit for any number of system calls, wherein inside the exit, information is captured and saved each time a particular system call is driven, such as, parameters passed to the system call, count of how many times system call was driven, information about the caller of the system call, calling environment information, time the syscall was driven, and creating a report from the test case after a set period of time, that details the list of system calls performed and breaking the report information in a variety of different ways, such as by task of by time frame.

Figure 2:
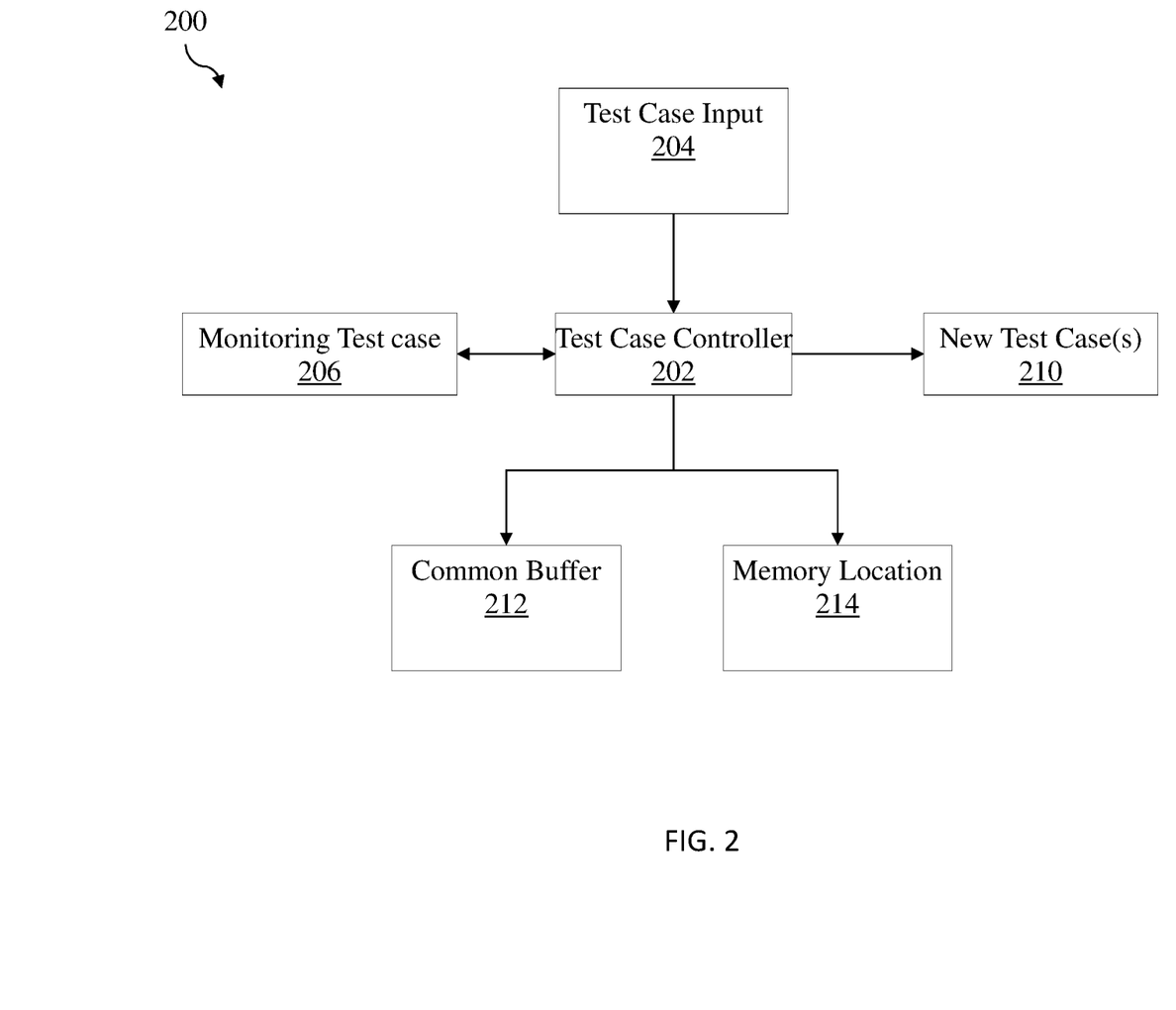
FIG. 2 depicts a block diagram of a system for validating and improving test case coverage according to one or more embodiments of the present invention.

FIG. 2 depicts a block diagram of a system for measuring and improving test case coverage according to one or more embodiments of the present invention. The system 200 includes a test case controller 202 that is operable to receive one or more test cases from the test case input 204. The test case input 204 can store a suite of test cases for execution to test, for example, a software product functionality. The system also includes a monitoring test case 206, a common buffer 212, and a shared memory location 214. In one or more embodiments, the test case controller 202 can receive a test case or a suite of test cases for execution. The test cases for execution include system calls to an operating system. In one or more embodiments, the test case controller 202 executes a monitoring test case 206 during the execution of each test case. The monitoring test case 206 includes a pre-exit instruction and a post-exit instruction. The monitoring test case 206 inserts the pre-exit instruction into the test case prior to a system call. The post-exit instruction is inserted into the test case after a system call. The pre-exit instruction is a process that gains control of the test case prior to the system call and collects pre-exit system call data about the particular system call that is about to be executed by the test case. Similarly, the post-exit instruction is a process that gains control of the test case after a system call is executed and collects post-exit system call data about the particular system call. The pre-exit system call data and the post-exit system call data can include parameters passed to the system call by the test case, a count of how many times the system call was driven in the test case, information about the caller of the system call, such as the task or a user identifier, the calling environment information, such as the addressing mode being called in, the time the system call was driven, and the like. The pre-exit and post-exit system call data can be stored in a shared memory location 214.

In one or more embodiments of the invention, the test case controller 202 can be implemented on the processing system 100 found in FIG. 1.

In one or more embodiments, after a period of time elapses, a report can be created from the monitoring test case that can detail a list of system calls performed by the test case. In one or more embodiments, the pre-exit and post-exit system call data can be utilized to identify issues for the system calls in a particular test case. For example, parameters and calling environment data can be collected and analyzed to determine how many different combinations of each parameter and calling environment were not driven for a particular system call. Additional test cases can be generated using these different combinations of parameters and calling environment to cover scenarios that the particular test case might have missed. The system 200 can generate one or more new test cases 210 and determine test coverage by utilizing the historical test data, and analyzing system call related data, thereby improving test coverage efficiency. This information can also be used to generate new test cases 210 that will drive system calls that were not called as frequently or system calls that were not called in all possible combinations of both calling environment and parameters. In addition, it will provide a metric for code coverage by the test cases.

Figure 3:
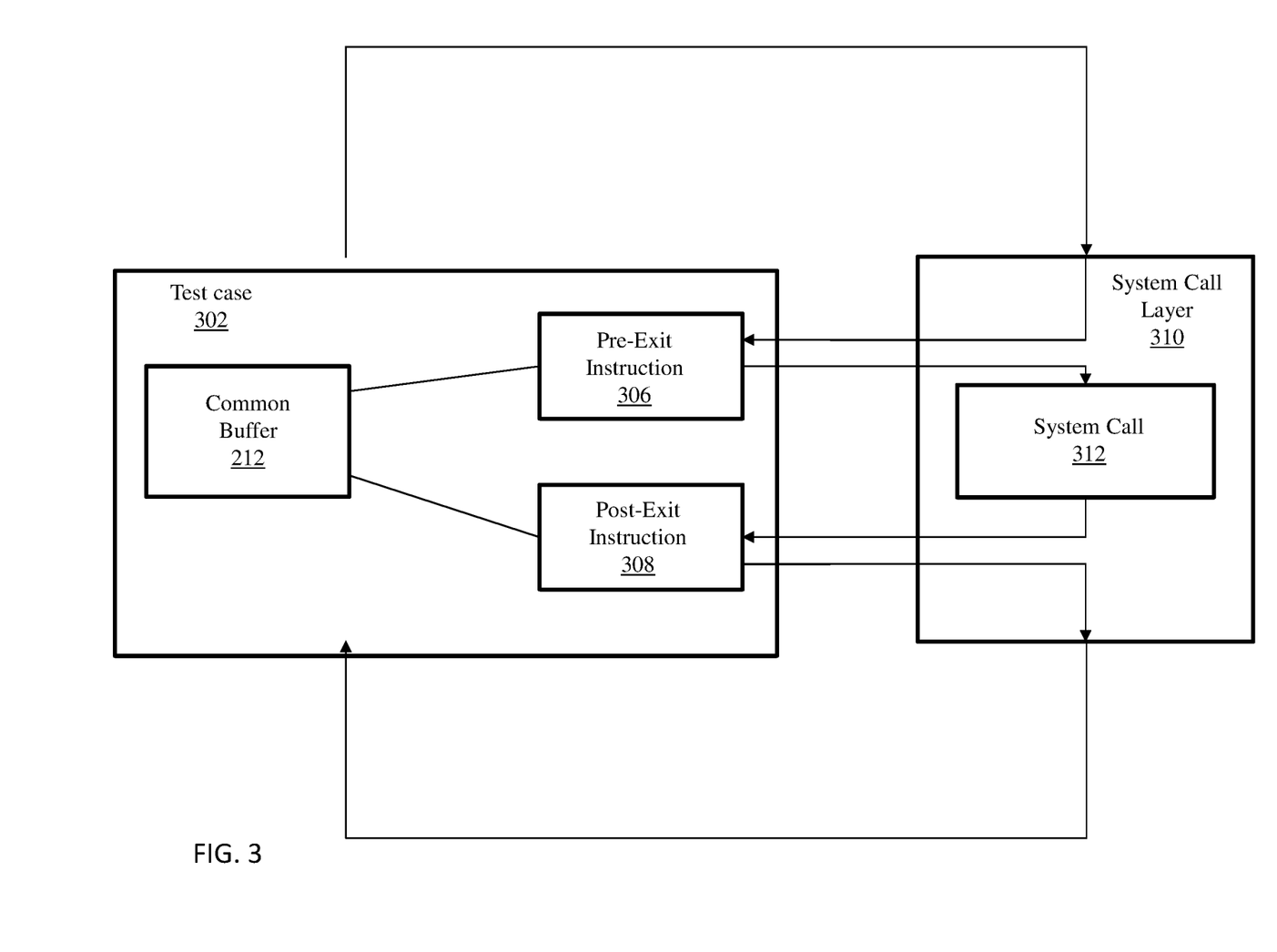
FIG. 3 depicts a flow diagram of method to test pre and post system call exits according to one or more embodiments.

In one or more embodiments, in a test case, a common buffer 212 can be set up and initialized before the invocation of a system call to store parameters and other characteristics for the system call. The test case controller 202 initializes the common buffer 212 prior to a system call in the test case. The test case controller 202 can store attributes regarding the system call in the common buffer 212. The common buffer 212 can include bit locations that can store a zero or a one in each bit location. Based on the attributes collected for the system call, the bit locations are set to a zero or one corresponding to the collected attributes. FIG. 3 depicts a flow diagram of a method to test pre and post system call exits according to one or more embodiments. The flow diagram includes a test case 302, the common buffer 212, and the system call layer 310 of an operating system. The test case 302 includes a pre-exit instruction 306 and a post-exit instruction 308. The system call layer includes a system call 312.

In one or more embodiments, the test case 302 initializes and sets up the common buffer 212 before a system call 312 is driven by the test case 302. The common buffer 212 will include expected system call parameters that will be collected from the system call 312 by the pre 306 and post 308 exit instruction. The test case 302 drives the system call 312 and the pre-exit instruction 306 gains control of the test case (e.g., the pre-exit instruction will be executed next). The pre-exit instruction 306 is an instruction that is run prior to the execution of the system call 312. The pre-exit instruction 306 collects pre-exit information about the system call 312. This pre-exit information is compared to the expected system call parameters in the common buffer 212. The pre-exit instruction 306, after comparing the pre-exit information to the common buffer 212, can set one or more bits in the common buffer 212 to confirm the expected data in the common buffer is what occurred in the system call 312. The pre-exit instruction 306 is located in a location that has access to the common buffer 212. Within the common buffer 212, the bit locations can be set to either a zero or one. For example, a first bit location can be set to one to indicate whether or not the pre-exit instruction 306 gained control prior to the system call 312. After the pre-exit instruction 306 is executed and sets the bits in the common buffer 212, control is returned to the system call layer 310 and the system call 312 is executed. The system call layer 312 calls the post-exit instruction 308. The post-exit instruction 308 collects post-exit information about the system call 312. This post-exit information is compared to the expected system call parameters in the common buffer 212 and different bit locations are set by the post-exit instruction 308 based on the post-exit information and the expected data. For example, the post-exit instruction 308 gains control and sets a bit location in the common buffer 212 to one to indicate that the post-exit instruction 308 gained control. Additional attributes about the system call 312 can be collected and stored in the common buffer 212. Control returns to the system call layer 312 which returns control back to test case 302. The test case 302 validates that both the pre-exit instruction 306 and the post-exit instruction 308 were properly called and that they gained control by checking the bit locations in the common buffer 212. Herein, gaining control of the test case refers to the pre-exit instruction 306 and/or the post-exit instruction 308 being executed prior to the system call and after the system call, respectively.

In one or more embodiments, after the post-exit instruction executes, the test case checks the bits (sometimes referred to as "flags") in the common buffer to determine that the pre and post exit gained control of the test case and the pre and post exit instruction data was validated. The system call parameters stored in the common buffer 212 can include but are not limited to system call type, addressing mode, execution environment, and the like. Bit are set based on a comparison of the pre-exit system call data and the post-exit system call data with the system parameters stored in the common buffer 212.

Depending on the number of system calls supported, it could become cost-prohibitive to validate that the system call exits were called appropriately. This testing method utilizing the common buffer can be used to validate any number of system call exits, requiring very little setup for the actual system call itself requiring less processing resources to achieve the desired result.

Figure 4:
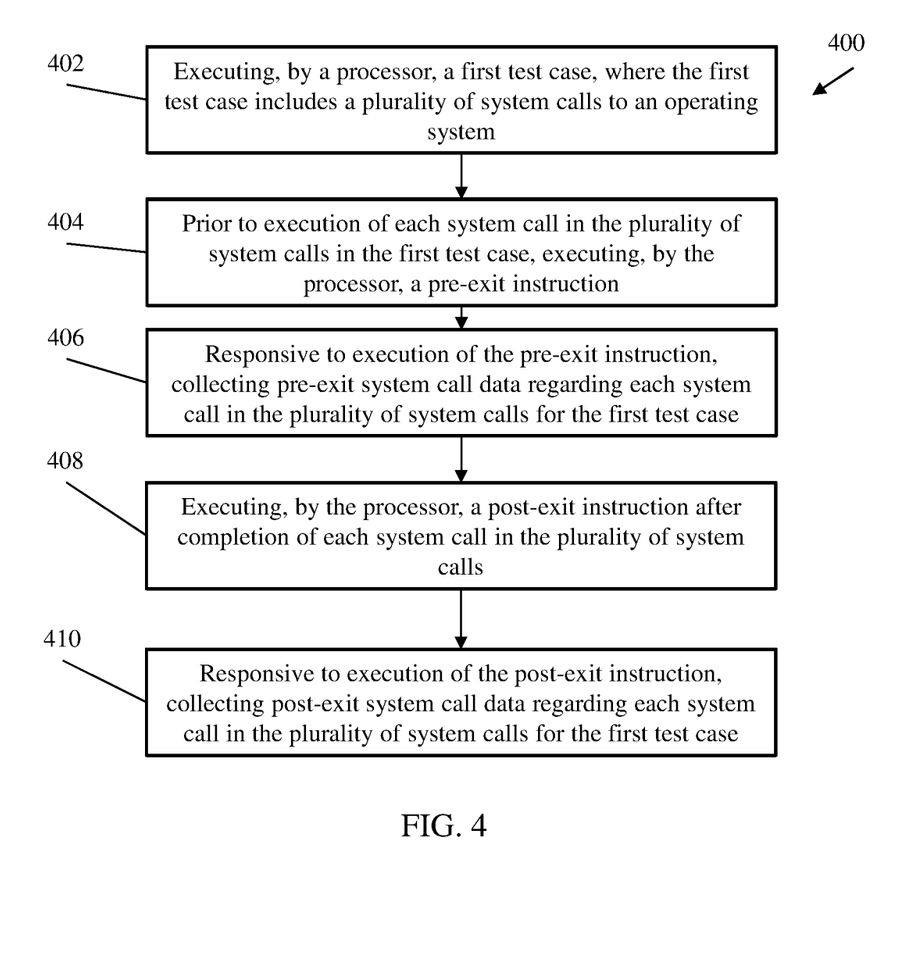
FIG. 4 depicts a flow diagram of a method for improving test coverage according to one or more embodiments of the invention.

FIG. 4 depicts a flow diagram of a method for improving test coverage according to one or more embodiments of the invention. The method 400 includes executing, by a processor, a first test case, where the first test case includes a plurality of system calls to an operating system as shown in block 402. Prior to execution of each system call in the plurality of system calls in the first test case, the method 400 includes executing, by the processor, a pre-exit instruction, as shown at block 404. Block 406 of the method 400 includes responsive to execution of the pre-exit instruction, collecting pre-exit system call data regarding each system call in the plurality of system calls for the first test case. The method 400 also includes executing, by the processor, a post-exit instruction after completion of each system call in the plurality of system calls, as shown at block 408. The method 400, at block 410, includes responsive to execution of the post-exit instruction, collecting post-exit system call data regarding each system call in the plurality of system calls for the first test case.

Additional processes may also be included. It should be understood that the processes depicted in FIG. 4 represent illustrations and that other processes may be added or existing processes may be removed, modified, or rearranged without departing from the scope and spirit of the present disclosure.

Figure 5:
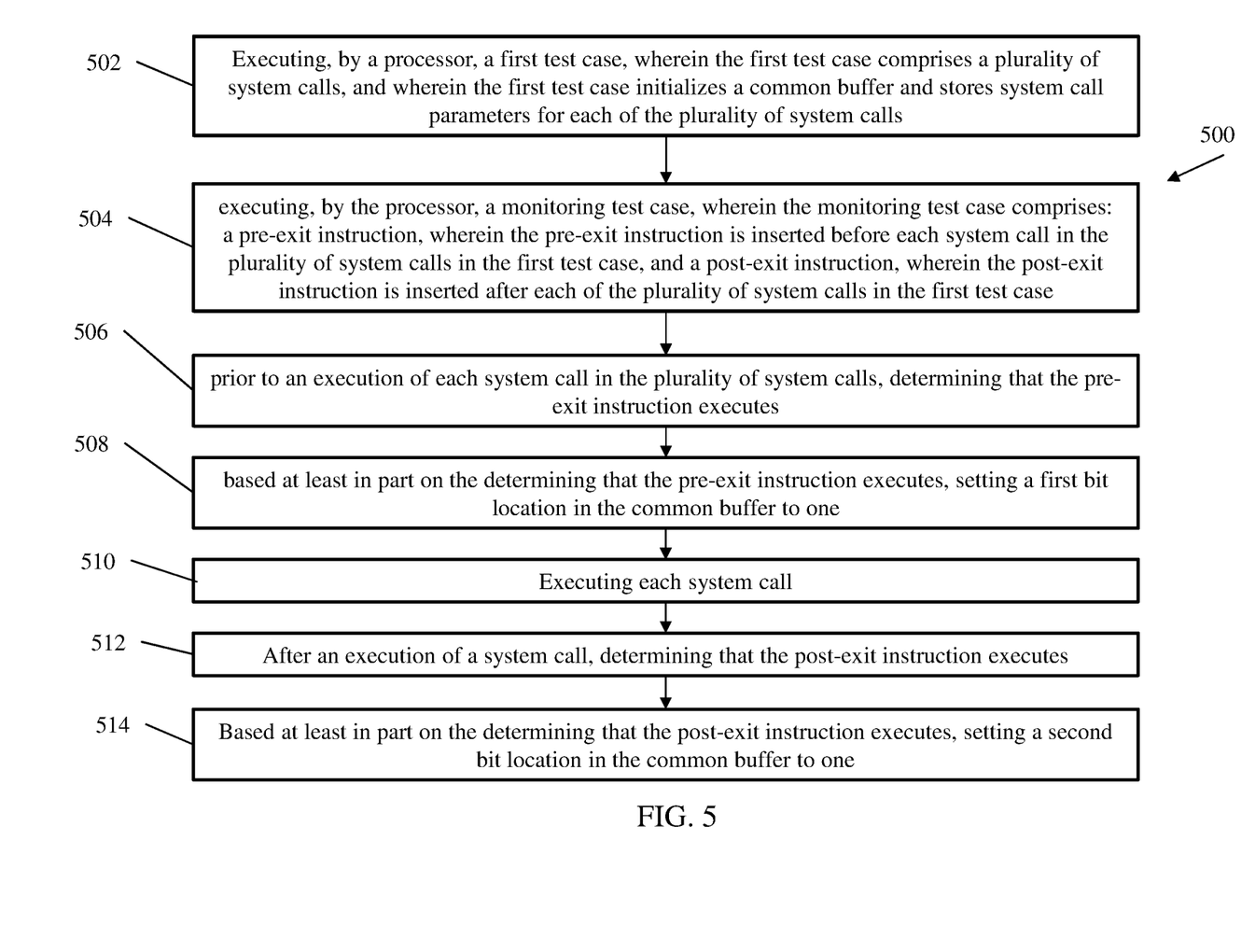
FIG. 5 depicts a flow diagram of a method for testing pre and post system call exits according to one or more embodiments of the invention.

FIG. 5 depicts a flow diagram of a method for testing pre and post system call exits according to one or more embodiments of the invention. The method 500 includes executing, by a processor, a first test case, wherein the first test case comprises a plurality of system calls and wherein the first test case initializes a common buffer and stores system call parameters for each of the plurality of system calls, as shown at block 502. The method 500, at block 504, includes executing, by the processor, a monitoring test case, wherein the monitoring test case comprises: a pre-exit instruction, wherein the pre-exit instruction is inserted before each system call in the plurality of system calls in the first test case and a post-exit instruction, wherein the post-exit instruction is inserted after each of the plurality of system calls in the first test case. At block 506, the method 500 includes prior to an execution of each system call in the plurality of system calls, determining that the pre-exit instruction executes and at block 508 based at least in part on the determining that the pre-exit instruction executes, setting a first bit location in the common buffer to one. The method 500 includes executing each system call, at block 510. At block 512, the method 500 includes after an execution of a system call, determining that the post-exit instruction executes. The method 500, at block 514, includes based at least in part on the determining that the post-exit instruction executes, setting a second bit location in the common buffer to one.

Additional processes may also be included. It should be understood that the processes depicted in FIG. 5 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   executing, by a processor, a first test case, where the first test case includes a plurality of system calls to an operating system;
   prior to execution of each system call in the plurality of system calls in the first test case, executing, by the processor, a pre-exit instruction, wherein the pre-exit instruction is inserted before each system call in the plurality of system calls in the first test case;
   responsive to execution of the pre-exit instruction, collecting pre-exit system call data regarding each system call in the plurality of system calls for the first test case, wherein the pre-exit system call data comprises a plurality of pre-exit parameters associated with each system call in the plurality of system calls, and
   wherein collecting pre-exit system call data comprises:
      initializing a common buffer comprising a set of bit locations;
      storing a first bit in a first bit location in the set of bit location based at least in part on a determination that the pre-exit instruction gains control of the first test case prior to an execution of the each system call;

storing a second bit in a second bit location in the set of bit locations based at least in part on comparing a first pre-exit parameter from the plurality of pre-exit parameters associated with one or more expected results for the pre-exit parameter;

executing, by the processor, a post-exit instruction after completion of each system call in the plurality of system calls;

responsive to execution of the post-exit instruction, collecting post-exit system call data regarding each system call in the plurality of system calls for the first test case, wherein the post-exit system call data comprises a plurality of post-exit parameters associated with each system call in the plurality of system calls, and wherein at least one post-exit parameter comprises environment information associated with the operating system;

storing a third bit in a third bit location in the set of bit locations based at least in part on comparing a post-exit parameter from the plurality of post-exit parameters associated with one or more expected results for the post-exit parameter;

determining a set of combinations of parameters and calling environments associated with the plurality of system calls that were not driven; and generating one or more new test cases based at least in part on the set of combinations.

2. The computer-implemented method of claim 1, where the pre-exit system call data includes a number of system call types executed in the first test case.

3. The computer-implemented method of claim 1, where the pre-exit system call data includes at least one of parameters passed to the system call, a type of task that made the system call, an address mode for the system call, and a time at which the system call was made.

4. The computer-implemented method of claim 1, further comprising generating one or more reports regarding the pre-exit system call data and the post-exit system call data.

5. The computer-implemented method of claim 4, further comprising generating one or more new test cases based at least in part on the one or more reports.

6. The computer-implemented method of claim 1, where the pre-exit instruction includes an exit to a monitoring test case.

7. The computer-implemented method of claim 1, where the post-exit instruction includes an exit to a monitoring test case.

8. The computer-implemented method of claim 1, where the one or more new test cases include a system call that was not included in the first test case.

* * * * *